United States Patent
Hsu et al.

(10) Patent No.: US 7,447,125 B2
(45) Date of Patent: Nov. 4, 2008

(54) METHOD AND APPARATUS FOR CONTROLLING TILT-ANGLE OF LENS IN OPTICAL PICK-UP HEAD

(75) Inventors: Jen-Yu Hsu, Taipei (TW); Tun-Chieh Lee, Taipei (TW); Ren-Chien Fu, Taipei (TW)

(73) Assignee: Lite-On It Corporation, Taipei (TW)

( * ) Notice: Subject to any disclaimer, the term of this patent is extended or adjusted under 35 U.S.C. 154(b) by 580 days.

(21) Appl. No.: 11/134,285

(22) Filed: May 23, 2005

(65) Prior Publication Data

US 2005/0270922 A1 Dec. 8, 2005

(30) Foreign Application Priority Data

Jun. 3, 2004 (TW) .............................. 93116036 A

(51) Int. Cl.
*G11B 7/00* (2006.01)

(52) U.S. Cl. ............................... 369/44.32; 369/53.19

(58) Field of Classification Search ............. 369/53.19, 369/44.32, 44.29, 44.11, 53.11, 53.12, 53.13, 369/53.14

See application file for complete search history.

(56) References Cited

U.S. PATENT DOCUMENTS

| | | | | |
|---|---|---|---|---|
| 5,148,420 A | * | 9/1992 | Yamamuro | 369/44.11 |
| 5,272,688 A | * | 12/1993 | Horiguchi | 369/99 |
| 6,434,096 B1 | * | 8/2002 | Akagi et al. | 369/44.32 |
| 7,196,991 B2 | * | 3/2007 | Nagaoka et al. | 369/53.19 |
| 7,215,607 B2 | * | 5/2007 | Watanabe et al. | 369/44.29 |
| 7,324,413 B2 | * | 1/2008 | Yamashita et al. | 369/44.29 |

\* cited by examiner

*Primary Examiner*—Nabil Z Hindi
(74) *Attorney, Agent, or Firm*—Bacon & Thomas, PLLC

(57) ABSTRACT

A method and an apparatus of adjusting the tilt-angle of the lens in the optical pick-up head. The apparatus includes a position detecting unit for detecting a position deviation of the lens against the sled, a parameter generating unit for generating a tilt control parameter according to the position deviation, and a tilt control unit for controlling the lens according to the tilt control parameter so that the lens maintains horizontal with reference to the sled.

12 Claims, 5 Drawing Sheets

METHOD AND APPARATUS FOR CONTROLLING TILT-ANGLE OF LENS IN OPTICAL PICK-UP HEAD

This application claims the benefit of Taiwan application Serial No. 93116036 filed Jun. 3, 2004, the subject matter of which is incorporated herein by reference.

BACKGROUND OF THE INVENTION

1. Field of the Invention

The invention relates in general to the method and the apparatus of controlling an optical disc drive, and more particularly to the method and the apparatus of controlling the tilt-angle of lens in the optical pick-up head.

2. Description of the Related Art

Optical storage media such as CD-ROM, CD-RW, and DVD-ROM, with the features of low cost and large storage space, have been widely used in various kinds of audio/video data storage, data backup, and etc.

FIG. 1 is a diagram of a carriage in an optical disc drive. The carriage 100 includes an optical pick-up head 110, a guide rod 102, 104, a spindle motor 106, and a sled motor 108. When accessing data from the optical disc, the spindle motor 106 rotates the optical disc, and the optical pick-up head 110 is driven by the sled motor 108 to shift along the guide rods 102 and 104, i.e., to shift along the radial direction of the optical disc to locate a corresponding track.

FIG. 2A is a sectional view of an optical pick-up head. The optical pick-up head 110 includes a sled 112, a lens 114, a support wire 116, and at least an actuator (not shown in the diagram). The sled 112 shifts along the guide rods 102 and 104. The lens 114 is hung in the sled via the support wire 116. By controlling the current supplied to the actuator, the lens 114 is controlled to shift along the radial direction to achieve a precise tracking. When performing a tracking on process, the lens 114 is shifted first without the sled 112 moved, and only when the lens 114 has reached the border of the sled 112, will the sled 112 move to access the following tracks.

However, when the lens 114 shifts from the center of the sled 112, a tilt-angle will be formed as shown in FIG. 2B and will affect the focusing of the laser beam. Moreover, in a DVD recorder that is becoming more and more popular today, the numerical aperture (NA) of the lens is about 65-67, which is higher than that of the lens in a DVD-ROM drive. Therefore, the tilted lens has even more negative influence on the quality of accessed data in a DVD recorder.

SUMMARY OF THE INVENTION

It is therefore an object of the invention to provide a method and an apparatus for adjusting the tilt-angle of the lens in the optical pick-up head to improve performance of accessing data.

The invention achieves the above-identified object by providing a method for adjusting a tilt-angle of a lens disposed in a sled of an optical pick-up head. The method includes the following steps. First, a position deviation of the lens against the sled is received. Next, a tilt control parameter set according to the position deviation is generated. Then, the lens is controlled according to the tilt control parameter set, so that the lens maintains horizontal with reference to the sled.

The invention achieves the above-identified object by providing an apparatus of adjusting the tilt-angle of the lens. The apparatus includes a position detecting unit for detecting a position deviation of the lens against the sled, a parameter generating unit for generating a tilt control parameter set according to the position deviation, and a tilt control unit for controlling the lens according to the tilt control parameter set so that the lens maintains horizontal with reference to the sled.

In an embodiment, the position deviation is obtained according to a central error (CEO) signal, and the tilt control parameter set is determined according to a tilt-angle table. The tilt-angle table is generated according to steps first shifting the lens to a target shift position against the sled. Then determine a plurality of test tilt control parameter sets and control the lens according to the test tilt control parameter sets respectively. Following by correspondingly receiving a plurality of tracking error signals outputted by the optical pick-up head, the tracking error signals are examined to find out the one with smallest amplitude. Finally the tilt-angle table can be generated according to the target shift position and the test tilt control parameter set corresponding to the smallest-amplitude tracking error signal.

Other objects, features, and advantages of the invention will become apparent from the following detailed description of the preferred but non-limiting embodiments. The following description is made with reference to the accompanying drawings.

DETAILED DESCRIPTION OF THE INVENTION

Figure 1:
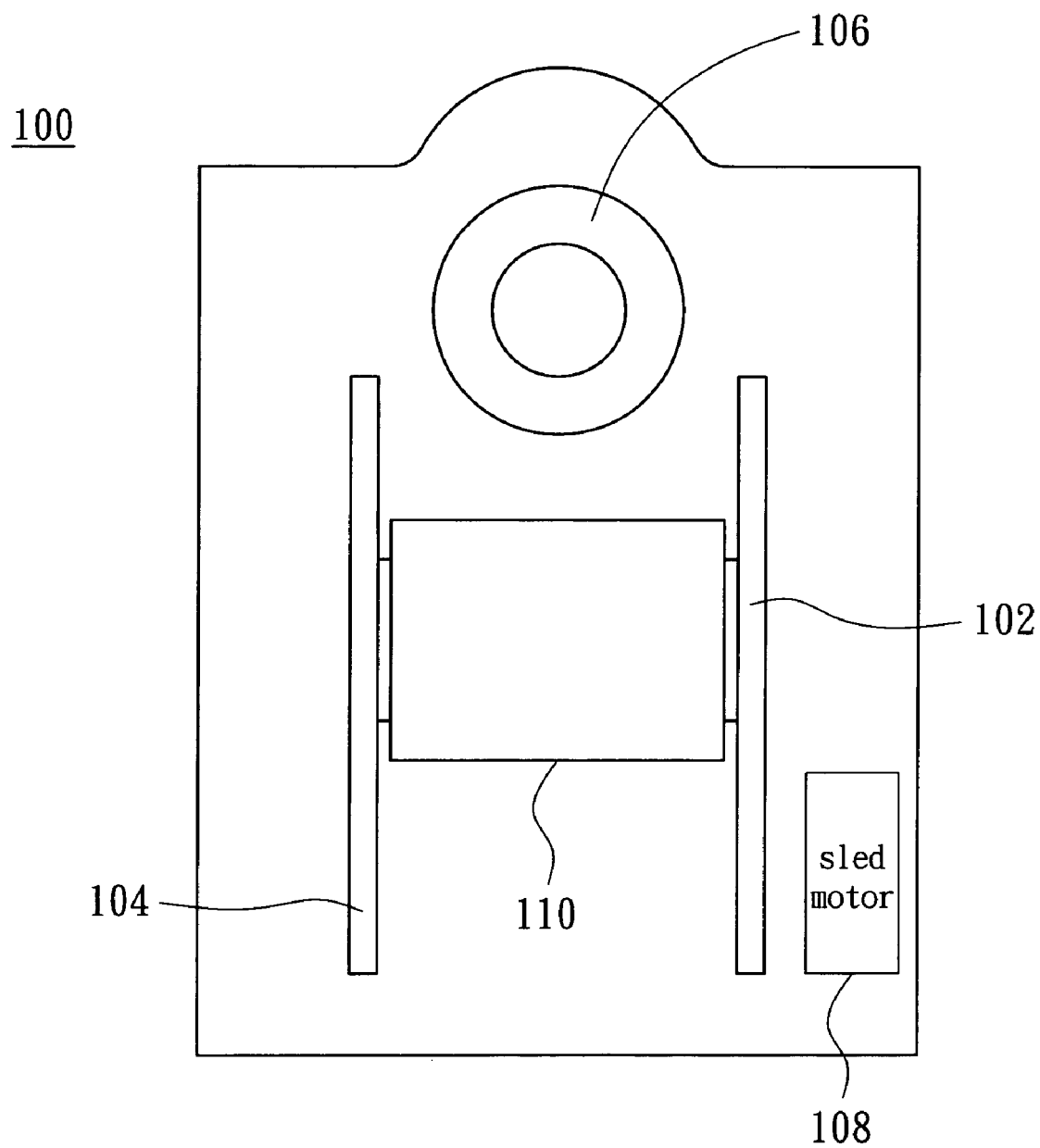
FIG. 1 is a perspective diagram of a carriage in an optical disc drive.
Figure 2A:
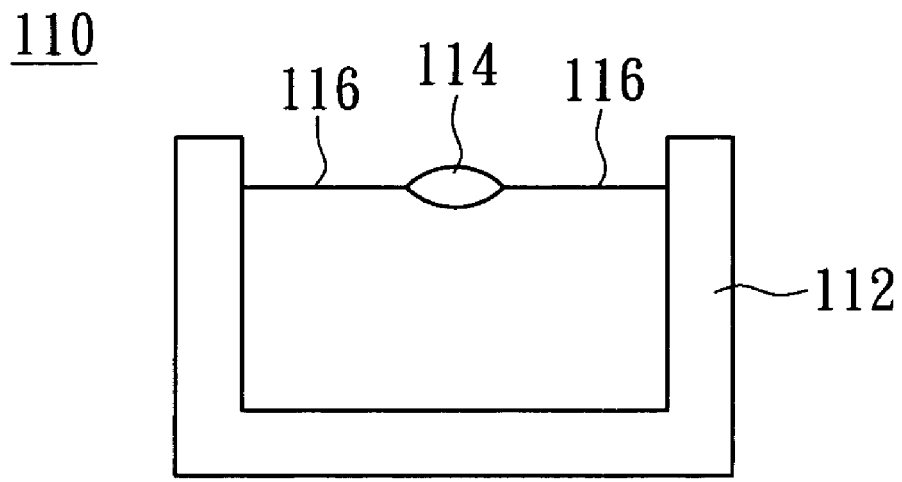
FIGS. 2A and 2B are sectional views of an optical pick-up head.
Figure 2B:
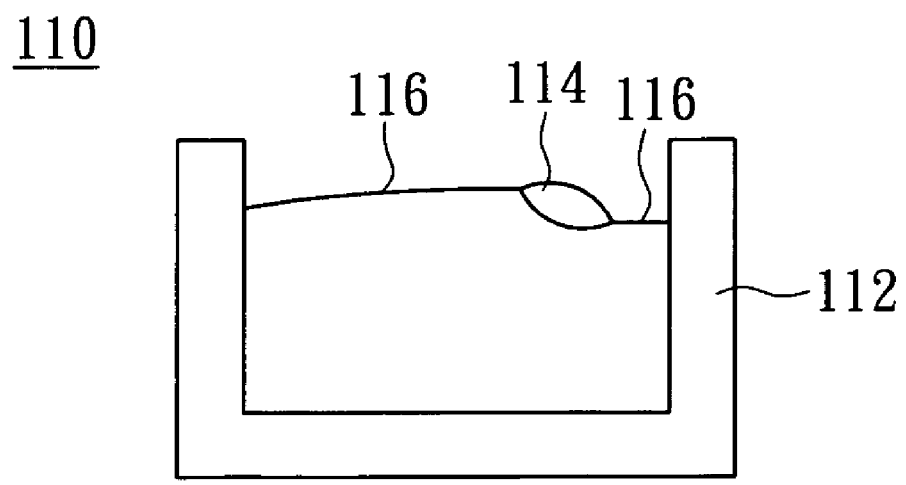
Figure 3:
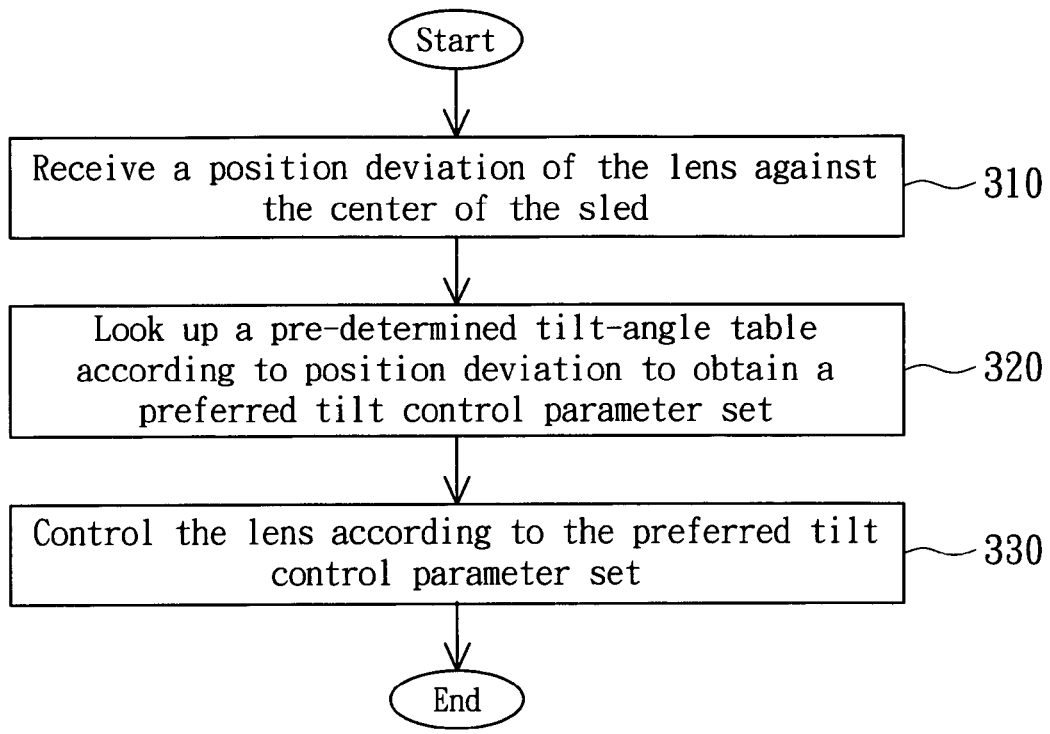
FIG. 3 is a flowchart of a method for controlling the tilt-angle of the lens in an optical pick-up head according to a preferred embodiment of the invention.

Referring to FIG. 3, a flowchart of a method for controlling the tilt-angle of the lens in the optical pick-up head according to a preferred embodiment of the invention is shown. First, a position deviation of the lens 114 against the center of the sled 112 is received as shown in the step 310. The position deviation can be determined according to the central error (CEO) signal outputted by the optical pick-up head.

Next, a preferred tilt control parameter set is obtained by looking up a pre-determined tilt-angle table according to the position deviation of lens as shown in the step 320. For example, the tilt control parameter set comprises at least one control parameter to determine the necessary currents supplied to at least one actuator whereby the tilt-angle of the lens 114 is controlled. The tilt-angle table, which has already been set before the optical disc drives left the factory, records the corresponding relationship between the position deviation and the preferred tilt control parameter set. The procedure of generating the tilt-angle table is disclosed afterwards.

Figure 4:
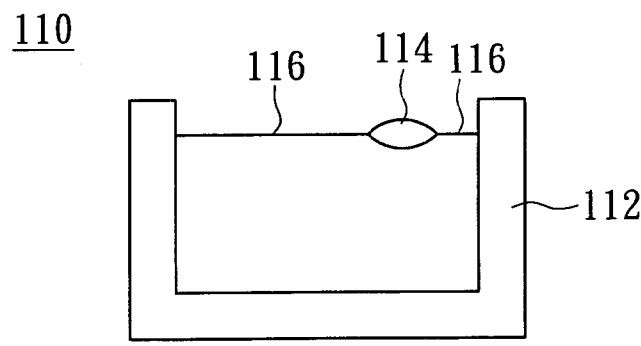
FIG. 4 is a perspective diagram of an optical pick-up head controlled according to the method of an embodiment of the invention.

Then, in step 330, the tilt-angle of the lens 114 is adjusted according to the preferred tilt control parameter set, for example, the lens 114 maintains horizontal with reference to the sled 112 as shown in FIG. 4.

FIG. 4 is a perspective diagram of an optical pick-up head controlled according to the method according to the preferred embodiment of the invention. Despite the lens 114 deviates from the center of the sled 112, the method according to the preferred embodiment still makes the lens 114 maintain horizontal for the optical pick-up head 110 to achieve a better accessing quality.

Figure 5:
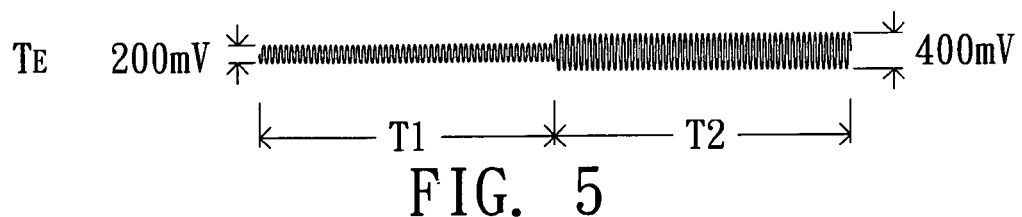
FIG. 5 is a perspective diagram of tracking error signal during on-track stage.

The procedure of generating the tilt-angle table is disclosed below. FIG. 5 is a diagram of tracking error signal TE during on-track stage. During on-track stage, the laser beam exactly projects onto the track, and the tracking error signal TE has relatively small amplitude. Moreover, during the on-track stage, it has been proved that when the lens is tilted, the measured amplitude of the tracking error signal TE (400 mV in T2 stage for instance) is larger than the amplitude measured when lens is not inclined (200 mV in T1 stage for instance). Therefore, the tilt-angle of the lens can be obtained according to the amplitude of the tracking error signal TE.

Figure 6:
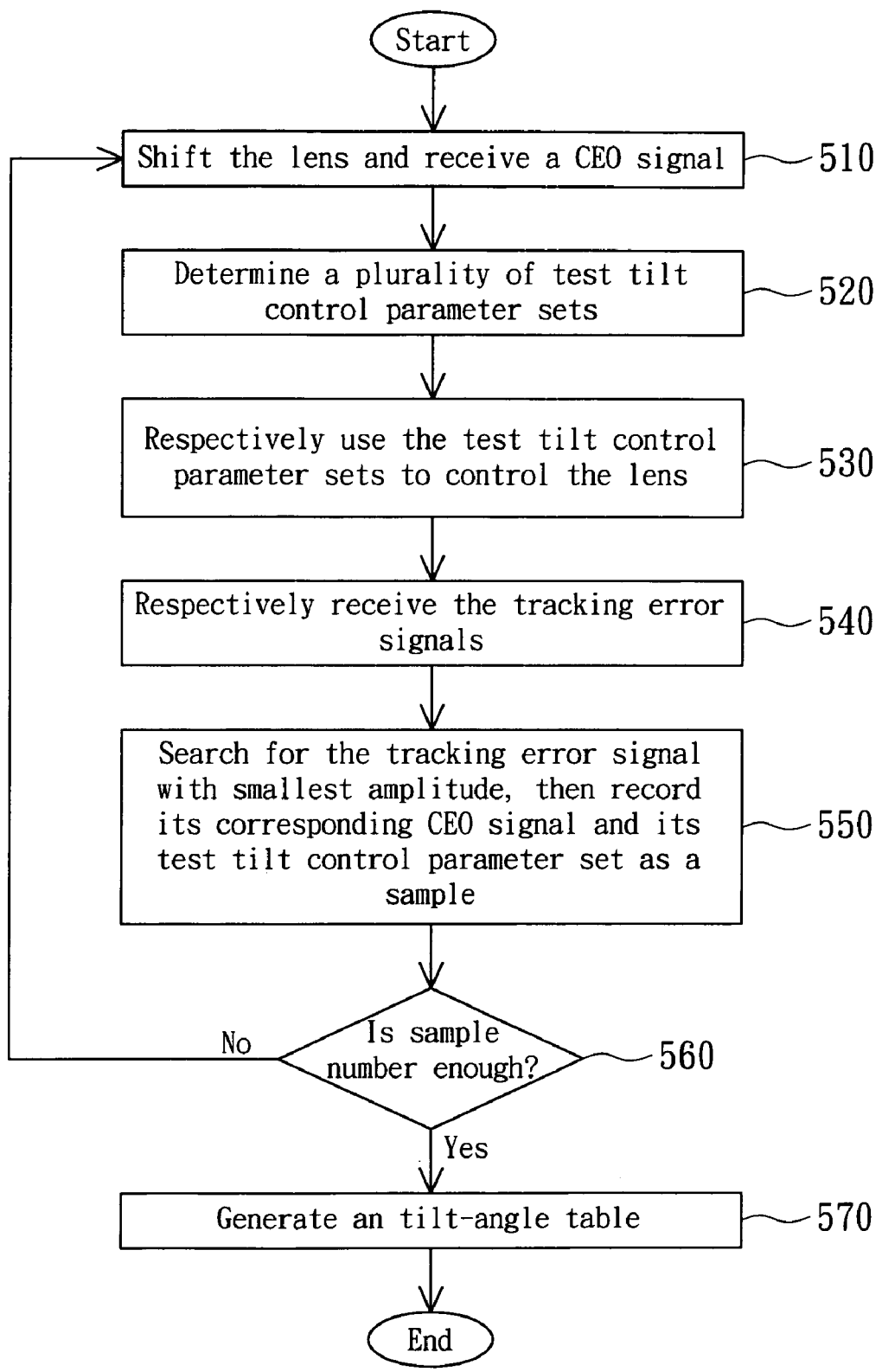
FIG. 6 is a flowchart of a method for generating a tilt-angle table.

FIG. 6 is a flowchart of the procedure for generating the tilt-angle table. First, the lens 114 is shifted to a target shift position against the sled 112, and then the CEO signal is received as shown in the step 510. Next, a plurality of test tilt control parameter sets are determined as shown in the step 520. After that, the test tilt control parameter sets are respectively used to control the lens 114 as shown in the step 530, and their corresponding tracking error signals are received as shown in the step 540.

Following that, the tracking error signals are examined to find out the one with smallest amplitude, which is recorded along with its corresponding CEO signal as a sample of the tilt-angle table as shown in the step 550. Then, in the step 560, it is determined whether enough samples have been collected: if so, the tilt-angle table is completed as shown in the step 570. Otherwise, the step 510 would be processed again to continue collecting the next sample.

The tilt-angle table generated according to the above procedure records the corresponding relationship between the CEO signals and the tilt control parameter sets. During the tracking on process, a preferred tilt control parameter set can be obtained by looking up the tilt-angle table according to the CEO signal outputted by the optical pick-up head, so the lens 114 can be controlled to have a better tilt-angle. For example, the lens 114 can maintain horizontal with reference to the sled 112. Generally speaking, the tilt-angle table generated according to the above procedure is implemented when the optical disc drive is calibrated during manufacturing and is recorded in the optical disc drive before the optical disc drive left the factory. Besides, the above procedure can be implemented by a user after the optical disc drive left the factory or can be implemented when a poor quality of data accessing of an optical pick-up head occurs, to have the lens maintain horizontal with reference to the sled.

Figure 7:
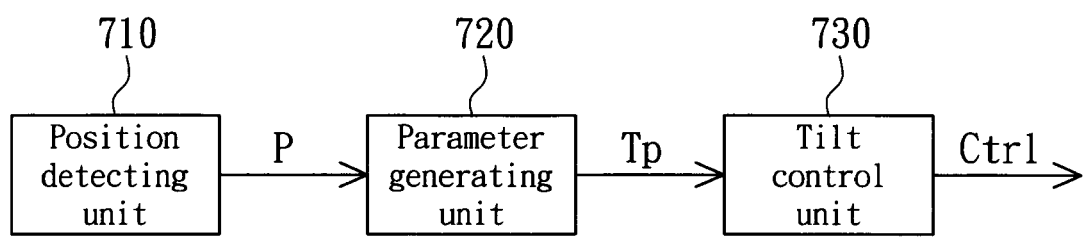
FIG. 7 is a block diagram of a device for controlling the tilt-angle of the lens in the optical pick-up head according to a preferred embodiment of the invention.

FIG. 7 is a block diagram of an apparatus for controlling the tilt-angle of the lens in the optical pick-up head according to a preferred embodiment of the invention. Apparatus 700 comprises a position detecting unit 710, a parameter generating unit 720 and a tilt control unit 730. The position detecting unit 710 detects the position deviation P of the lens 114 with reference to the center of the sled 112 according to a central error (CEO) signal outputted by the optical pick-up head. The parameter generating unit 720 looks up a pre-determined tilt-angle table according to position deviation P to obtain a preferred tilt control parameter set Tp. The tilt control unit 730 generates a set of control values Ctrl according to the preferred tilt control parameter set Tp to control the lens 114, so that the lens can have a better tilt-angle so as to let the lens 114 maintain, for example, horizontal with reference to the sled. The position detecting unit 710, the parameter generating unit 720, and the tilt control unit 730 can be implemented using a hard-wired circuit or a software program executed by a microprocessor.

The method and the apparatus for controlling tilt-angle of lens in the optical pick-up head disclosed in the above embodiments of the invention enable the lens to maintain horizontal when the sled shifts, so that the Laser light can focus better and the performance of data accessing can be improved.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method for adjusting a tilt-angle of a lens disposed in a sled of an optical pick-up head, the method comprising: receiving a position deviation of the lens against the sled; generating a tilt control parameter set according to the position deviation; and controlling the lens according to the tilt control parameter set, so that the lens maintains horizontal with reference to the sled, wherein the step of generating the tilt control parameter set is performed according to a tilt-angle table which is generated according to steps comprising: shifting the lens to a target shift position against the sled; determining a plurality of test tilt control parameter sets; controlling the lens according to the test tilt control parameter sets respectively, and correspondingly receiving a plurality of tracking error signals outputted by the optical pick-up head; examining the tracking error signals to find out the one with smallest amplitude; and generating the tilt-angle table according to the target shift position and the test tilt control parameter set corresponding to the smallest-amplitude tracking error signal.

2. The method according to claim 1, wherein the position deviation is obtained according to a central error (CEO) signal.

3. The method according to claim 1, wherein the method is applied during performing a tracking on process.

4. The method according to claim 1, wherein the tilt-angle table is generated during an on-track stage.

5. An apparatus for adjusting a tilt-angle of a lens in an optical pick-up head, the optical pick-up head having a sled in which the lens is disposed, the apparatus comprising: a position detecting unit for detecting a position deviation of the lens against the sled; a parameter generating unit for generating a tilt control parameter set according to the position deviation; and a tilt control unit for controlling the lens according to the tilt control parameter set so that the lens maintains horizontal with reference to the sled, wherein the tilt control parameter set is generated according to a tilt-angle table which is generated according to steps comprising: shifting the lens to a target shift position against the sled; determining a plurality of test tilt control parameter sets; controlling the lens according to the test tilt control parameter sets respectively, and correspondingly receiving a plurality of tracking error signals outputted by the optical pick-up head; examining the tracking error signals to find out the one with smallest amplitude; and generating the tilt-angle table according to the target shift position and the test tilt control parameter set corresponding to the smallest-amplitude tracking error signal.

6. The apparatus according to claim 5, wherein the position detecting unit outputs the position deviation according to a central error (CEO) signal.

7. The apparatus according to claim 5, controlling the tilt-angle of the lens during performing a tracking on process.

8. The apparatus according to claim 5, being implemented using a hard-wired circuit or a software program executed by a microprocessor.

9. A method for determining a preferred tilt control parameter set for controlling a tilt-angle of a lens in a sled of an optical disc drive, so that the lens maintains horizontal with reference to the sled, the method comprising: controlling the lens according to a plurality of test tilt control parameter sets respectively, and correspondingly receiving the tracking error signals outputted by the optical pick-up head; examining the tracking error signals to find out the one with smallest amplitude, and the test tilt control parameter set corresponding to the tracking error signal with smallest amplitude is the preferred tilt control parameter set.

10. The method according to claim 9, wherein the method is repeated at different position deviations such that a plurality of preferred tilt control parameter sets are generated with respect to the position deviations, and a tilt-angle table are generated according to the position deviations and the preferred tilt control parameter sets.

11. The method according to claim 10, wherein each position deviation is obtained according to a central error (CEO) signal.

12. The method according to claim 9, wherein the method is applied during an on-track stage.

* * * * *